(12) United States Patent
Buehler et al.

(10) Patent No.: US 9,306,491 B2
(45) Date of Patent: Apr. 5, 2016

(54) ELECTRICAL TEST APPARATUS FOR A PHOTOVOLTAIC COMPONENT

(75) Inventors: Pat Buehler, Pemberville, OH (US);
David Kahle, Monclova, OH (US);
Matthew J. Mattin, Delta, OH (US);
Kevin Niebel, Toledo, OH (US)

(73) Assignee: First Solar, Inc., Perrysburg, OH (US)

( * ) Notice: Subject to any disclaimer, the term of this patent is extended or adjusted under 35 U.S.C. 154(b) by 996 days.

(21) Appl. No.: 13/472,217

(22) Filed: May 15, 2012

(65) Prior Publication Data

US 2012/0293182 A1    Nov. 22, 2012

Related U.S. Application Data

(60) Provisional application No. 61/486,525, filed on May 16, 2011.

(51) Int. Cl.
*G01R 31/02* (2006.01)
*H02S 50/10* (2014.01)

(52) U.S. Cl.
CPC ........................ *H02S 50/10* (2014.12)

(58) Field of Classification Search
CPC ................ H01L 22/34; H01L 31/02021
USPC ........... 324/537, 702, 750.23, 754.01, 754.23
See application file for complete search history.

(56) References Cited

U.S. PATENT DOCUMENTS

| | | |
|---|---|---|
| 3,970,934 A | 7/1976 | Aksu |
| 4,656,419 A * | 4/1987 | Garlick .............. G01R 31/2632 136/290 |
| 5,808,474 A | 9/1998 | Hively et al. |
| 6,002,263 A | 12/1999 | Peters et al. |
| 6,140,570 A | 10/2000 | Kariya |
| 6,215,060 B1 * | 4/2001 | Komori et al. ................. 136/251 |
| 6,273,955 B1 * | 8/2001 | Yoshino .................. C23C 16/24 118/718 |
| 6,750,662 B1 * | 6/2004 | Van Der Heide ............. 324/702 |
| 7,019,513 B1 | 3/2006 | Faifer et al. |
| 7,362,088 B1 | 4/2008 | Faifer et al. |
| 7,581,656 B2 * | 9/2009 | Gnepper et al. ............... 220/608 |
| 7,839,136 B1 | 11/2010 | John |
| 7,852,096 B2 | 12/2010 | Eickhoff et al. |
| 7,928,315 B2 | 4/2011 | Nagai et al. |
| 8,115,496 B2 | 2/2012 | Kimura |
| 8,257,326 B2 * | 9/2012 | Vitaris ......................... 604/305 |
| 2001/0045228 A1 * | 11/2001 | Takada et al. .................. 136/244 |
| 2004/0173371 A1 * | 9/2004 | Fukushima .................. 174/52.3 |
| 2006/0137733 A1 * | 6/2006 | Schripsema et al. ........... 136/246 |
| 2007/0012352 A1 * | 1/2007 | Wohlgemuth et al. ......... 136/251 |
| 2007/0119718 A1 * | 5/2007 | Gibson et al. .................. 205/637 |
| 2008/0032502 A1 * | 2/2008 | Baskin et al. .................. 438/680 |
| 2008/0066802 A1 * | 3/2008 | Reddy ............................ 136/258 |

(Continued)

FOREIGN PATENT DOCUMENTS

WO   WO 2007/100319 A1   9/2007

OTHER PUBLICATIONS

J. Bohland et al., "Specific PVMaT R&D in CdTe Product Manufacturing", National Renewable Energy Laboratory, Jan. 2004, pp. 1-66.

*Primary Examiner* — Son Le
*Assistant Examiner* — Giovanni Astacio-Oquendo
(74) *Attorney, Agent, or Firm* — Blank Rome LLP (57) ABSTRACT

The present invention relates to electrical test apparatuses for photovoltaic components and methods of testing photovoltaic components.

25 Claims, 5 Drawing Sheets

(56) References Cited

U.S. PATENT DOCUMENTS

2008/0280086 A1* 11/2008 Sheridan et al. ............. 428/40.7
2011/0132434 A1* 6/2011 Correia et al. ................ 136/248
2014/0139249 A1* 5/2014 Dobson .............. G01R 1/06711
　　　　　　　　　　　　　　　　　324/755.01

\* cited by examiner

ELECTRICAL TEST APPARATUS FOR A PHOTOVOLTAIC COMPONENT

CROSS-REFERENCE TO RELATED APPLICATION

This application claims priority to Provisional U.S. Patent Application 61/486,525, filed on May 16, 2011, the disclosure of which is incorporated by reference in its entirety.

TECHNICAL FIELD

The present invention relates to electrical test apparatuses for photovoltaic components and methods of testing photovoltaic components.

BACKGROUND

Photovoltaic modules must pass a series of mechanical and electrical safety tests prior to use. In particular, photovoltaic modules must pass a dry high-potential test. In this test procedure, a high voltage is applied to a current-carrying conductor within the photovoltaic module. A metallic chassis of the device serves as an electrical ground. Leakage current is measured between the current-carrying conductor and the metallic chassis. The amount of leakage current provides an indication of the device's insulation quality. Devices that lack a metallic chassis must be modified prior to testing. For example, when a device lacks a metallic chassis, a temporary conducting surface must be applied to the outer surfaces of the device. Test data are highly dependent on how the temporary conducting surface is applied. As a result, repeatability is lacking when the test procedure is done manually.

DETAILED DESCRIPTION

A photovoltaic module is a group of photovoltaic cells connected electrically and packaged into a frame or panel. A photovoltaic (PV) cell is a device, often made of a semiconductor material that converts light energy or photons into electricity. When light strikes the PV cell, a certain portion of the light is absorbed within the semiconductor material. The energy of the absorbed light or photon is transferred to the semiconductor material, where it forces electrons to escape from their normal positions associated with a particular atom. This flow of electrons generates a current. By placing conductive contacts, such as metal contacts, on the top and bottom of the PV cell, current can be drawn off for external use.

Prior to sale and certification, a photovoltaic module must pass a series of safety compliance tests. The tests frequently assess mechanical and electrical compliance of the device. One such test is the dry high-potential test, also referred to as the dielectric withstand test, which confirms that a product's insulation is sufficient to protect an operator from electrical shock. Accordingly, the dry high-potential test is commonly used to verify the performance of electrical insulation in finished appliances, such as cables, wired assemblies, printed circuit boards, electric motors, transformers, etc. During the test, high voltage is applied between a product's current-carrying conductors and its metallic chassis. Current that flows through the insulation is measured by a current measuring device and is referred to as "leakage current." If the insulation does not break down during the application of high voltage, it is assumed that the product will be safe to use under normal operating conditions.

The dry high-potential test procedure must be modified when a product lacks a metallic chassis. For instance, the product must be coated with a conducting material such as aluminum foil. During the test, high voltage is applied between the product's current-carrying conductors and the foil layer. Current that flows through the insulation (i.e. from the conductors to the foil layer) is measured and is referred to as "leakage current." Unfortunately, the way the product is wrapped and tested may affect the resulting data. Accordingly, an improved test apparatus and method are needed to ensure integrity of data obtained when testing products with non-metallic exteriors.

Test devices used to carry out electrical compliance testing, such as the dry high-potential test, are known as electrical safety test devices. Electrical test devices are designed to measure and detect a multitude of items, including AC dielectric strength, DC dielectric strength, and insulation resistance. The AC and DC dielectric tests measure the withstand capability of an insulator, whereas an insulation resistance test measures the resistance of an insulator or insulation during a test. Devices that fail electrical compliance tests are not saleable, since their flawed designs could result in a hazardous amount of current flowing from the device to the user.

The testing method for high potential test devices can be automatic, semi-automatic, or manual. Some test devices are fully automated and require no human involvement once testing has been initiated. These devices rely on a stored program that executes a test procedure or a series of test procedures. Conversely, manual testing requires the presence of an operator to physically control test parameters such as voltage and time. The operator may also need to record measurements such as leakage current. As a lower cost option compared to fully automated systems, semi-automatic systems provide some of the benefits of fully automated systems while still requiring some operator involvement.

Figure 1:
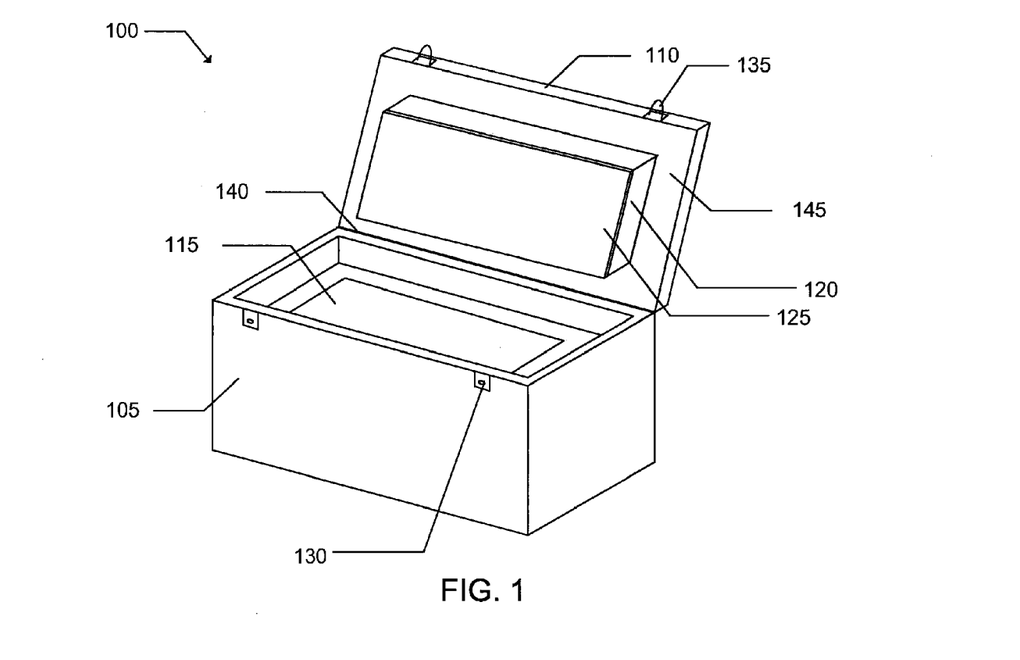
FIG. 1 is a perspective view of an electrical test apparatus.

As shown in FIG. 1, an electrical test apparatus 100 may include an enclosure 105 and a lid 110 attached to the enclosure 105. The lid 110 may be attached to the enclosure by any suitable connection, including, for example, a hinge 140, a coil, a spring, a piston, or any other suitable connection that allows the lid 110 to open and close relative to the enclosure 105. Alternately, the lid 110 may be detachable from the enclosure 105. The lid 110 may have a bottom surface 145 opposite a top surface. The lid 110 and the enclosure 105 may be constructed from any suitable material, including, for example, stainless steel, aluminum, polycarbonate, acrylonitrile butadiene styrene (ABS), polypropylene, polyethylene, fiberglass, polyvinyl chloride (PVC), and chlorinated polyvinyl chloride (CPVC). The test apparatus 100 may have a rectangular cuboid shape as shown in FIG. 1. Alternatively, the test apparatus 100 may be any suitable shape enabling it to receive a photovoltaic module or a component of a photovoltaic module.

Figure 6:
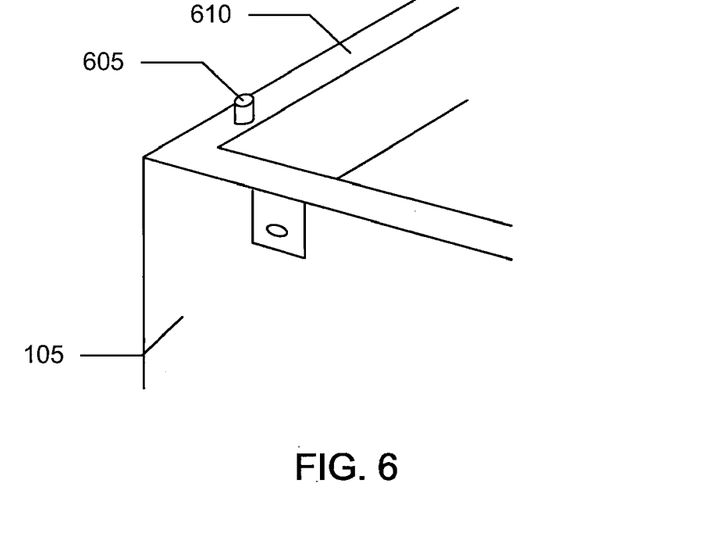
FIG. 6 is a perspective view of an electrical test apparatus.

As shown in FIG. 1, a first conducting layer 115 may be disposed within the enclosure 115. For instance, the first conducting surface 115 may be recessed downwardly from a rim surface 610 of the enclosure 105 as shown in FIGS. 1 and 6. Also, the first conducting surface 115 may be parallel to the bottom surface of the lid 110 when the lid 110 is in a closed position. The first conducting layer 115 may be any suitable conductor including, for example, stainless steel, aluminum, or copper. Alternately, the first conducting layer 115 may be a conductive coating applied to a non-conducting base material. For instance, the first conducting layer 115 may be a nickel plating applied over a polymer sheet. The first conducting layer 115 may be supported within the enclosure by any suitable supports. For instance, sidewalls within the enclosure may contain supports such as brackets, grooves, and ledges to retain the sheet. Alternately, the enclosure may be shallower than the enclosure shown in FIG. 1, and the sheet containing the first conducting layer may define a bottom surface of the enclosure 105.

Figure 2:
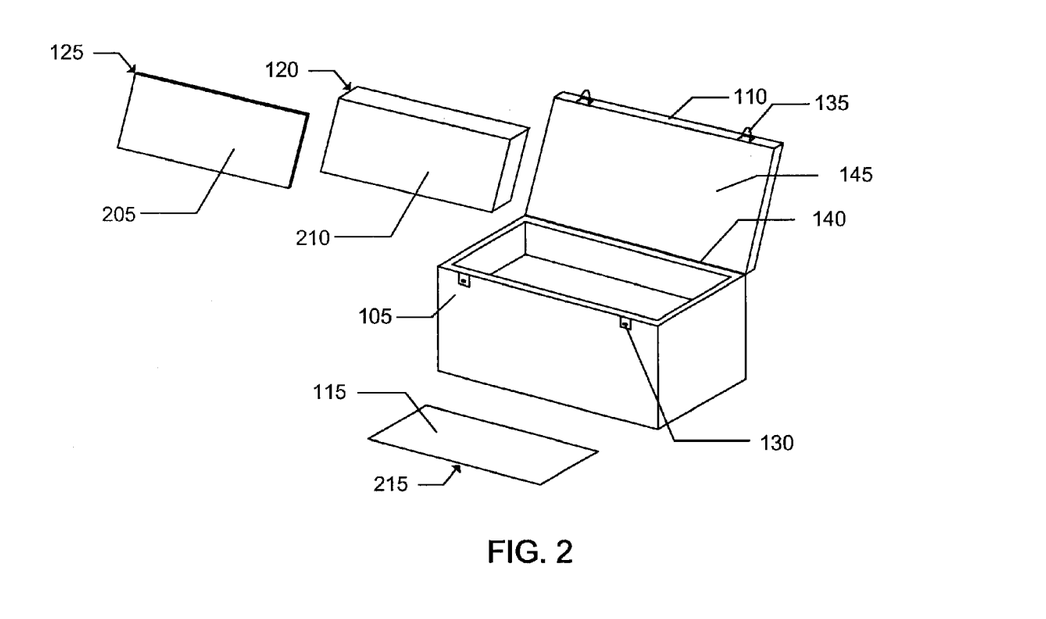
FIG. 2 is an exploded view of an electrical test apparatus.

As shown in FIG. 1, a backing layer 120 may be attached to an underside of the lid 110 using any suitable adhesive or fastener, including, for example, screws, rivets, glue, epoxy, rubber cement, or tape. The backing layer 120 may have a thickness greater than or equal to the depth at which the first conducting layer 115 is recessed downwardly within the enclosure 105. The thickness of the backing layer permits the first conducting layer 115 to make contact with the second conducting layer 125 when the lid 110 is closed. As shown in FIG. 2, the backing layer may have a bottom surface 210. The backing layer 120 may be any suitable type of backing capable of compressing when pressure is applied to its surfaces. For instance, the backing layer 120 may be a foam-type material such as polystyrene, polymethacrylimide, polyvinylchloride, polyurethane, polypropylene, and polyethylene.

Alternately, the backing layer 120 can be constructed from any non-foam material that exhibits compressibility characteristics similar to the foam-type material. For example, the backing layer 120 can be an air bladder that is inflated or deflated to alter its size, thereby changing the pressure that is applied to a photovoltaic component 405. The second conducting layer 125 can be affixed to the inflatable bladder, and air can be introduced into the bladder and regulated using any suitable pressurized air system. By increasing the volume of the air bladder, the second conducting layer 125 can be pressed against the photovoltaic module 405 to enable testing.

Figure 10:
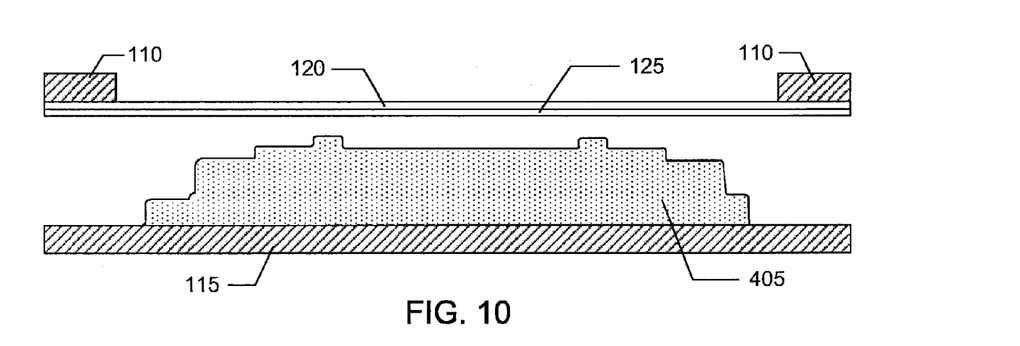
FIG. 10 is a cross-sectional view of an electrical test apparatus in an open position.
Figure 11:
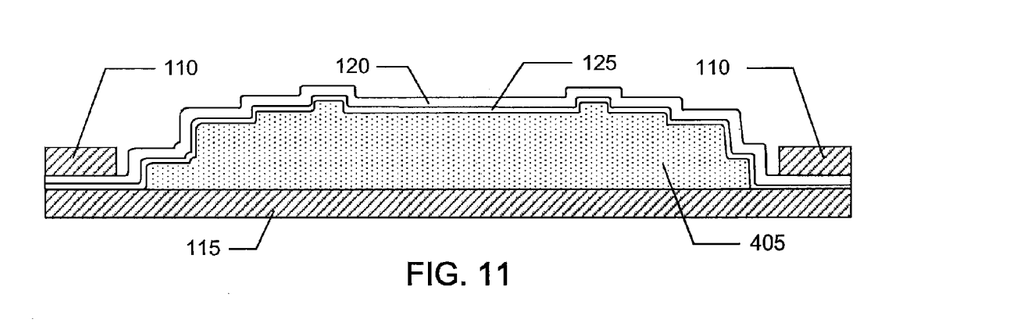
FIG. 11 is a cross-sectional view of an electrical test apparatus in a closed position.

In another configuration, the backing layer 120 may be constructed from a flexible material, such as a rubber or plastic sheet, as shown in FIGS. 10 and 11. The second conducting layer 125 may be attached to the backing layer 120, and the backing layer 120 may be attached to the lid 110. The lid 110 may include a sealing frame extending around the perimeter of the backing layer 120. FIG. 10 shows a cross-sectional view of the test apparatus 100 with the lid in an open position, and FIG. 11 shows a cross-sectional view of the test apparatus 100 with the lid in a closed position. Upon closing of the lid, the second conducting layer 125 is brought into contact with the photovoltaic component 405. A seal may be formed around the perimeter of the second conducting layer 125 where it contacts the first conducting layer 115. A vacuum may be applied to the test apparatus 100 to evacuate any air trapped between the second conducting layer 125 and the photovoltaic component 405. Consequently, the second conducting layer 125 may be brought into close contact with the photovoltaic component 405, thereby facilitating reliable electrical testing of the component 405.

Figure 4:
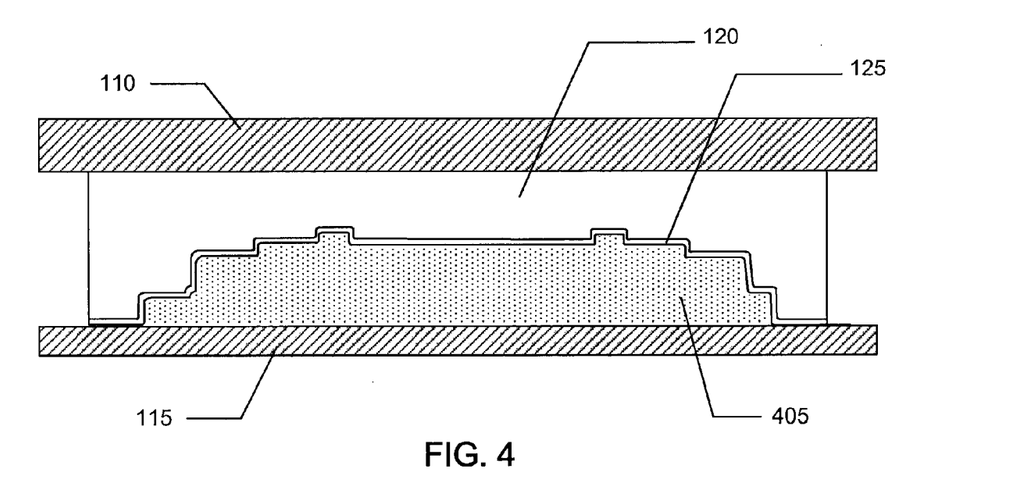
FIG. 4 is a cross-sectional view of an electrical test apparatus.

As shown in FIG. 1, a second conducting layer 125 may be attached to a bottom surface 210, which is shown in FIG. 2, of a backing layer 120 using any suitable adhesive or fastener, including, for example, screws, rivets, glue, epoxy, rubber cement, or tape. The second conducting layer 125 may include any deformable conductor, including, for example, aluminum foil. Aluminum foil works particularly well since it is capable of conforming to the shape of the device or component being tested. For instance, as shown in FIG. 4, when a photovoltaic component 405 is placed on the first conducting layer 115 and the lid 110 is closed, the backing layer 120 and the second conducting layer 125 conform to the shape of the product being tested. As a result of the design described herein, uniform pressure may be applied to the backing and foil across the top surface of the product being tested. As a result, repeatability and integrity of test data may be vastly improved. In particular, the repeatability and integrity of leakage current measurements taken between the first and second conducting surfaces (e.g. 115, 125) and a current-carrying conductor positioned within the component 405 may be improved.

The photovoltaic component 405 may be a photovoltaic module or any component used to construct a photovoltaic module or array. For example, the photovoltaic component 405 may be a cord plate. In a solar module, the cord plate can be attached to a rear side of a module and functions as a junction box permitting interconnection with other modules and electrical components.

Figure 8:
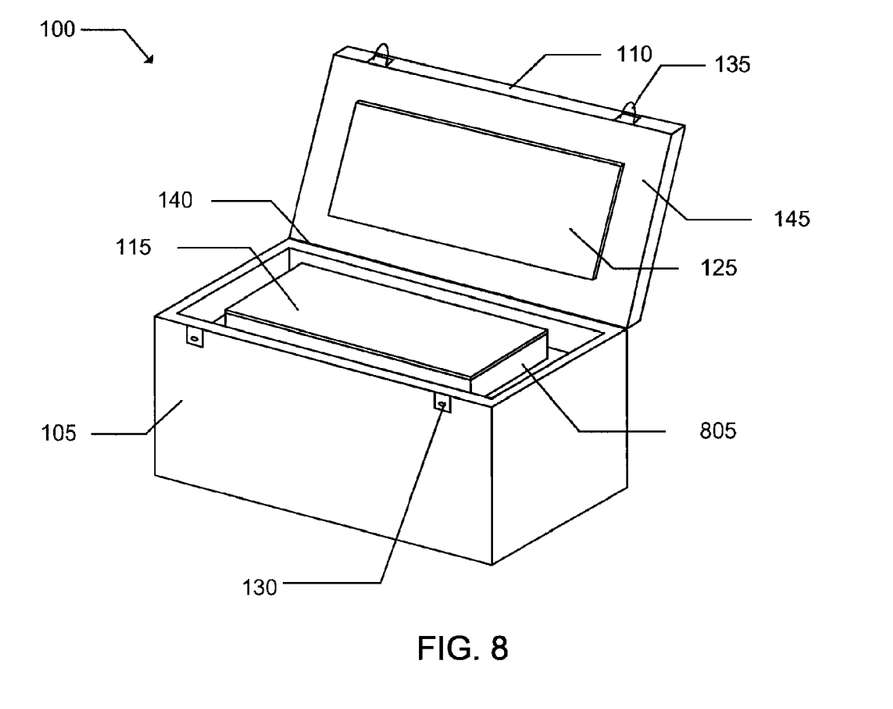
FIG. 8 is a perspective view of an electrical test apparatus.

As shown in FIG. 8, a second backing layer 805 may be associated with the first conducting layer 115. For instance, the first conducting layer 115 may be attached to a top surface of the second backing layer 805. In particular, the first conducting layer 115 may be a foil layer atop a second backing layer 805. The first conducting layer 115 may be attached to a top surface of the second backing layer 805 using any suitable adhesive or fastener, including, for example, screws, rivets, glue, epoxy, rubber cement, or tape. The second conducting layer 125 may be a conducting layer attached to the bottom surface 145 of the lid 110, or the second conducting layer 125 may be the lid 110 itself.

Figure 9:
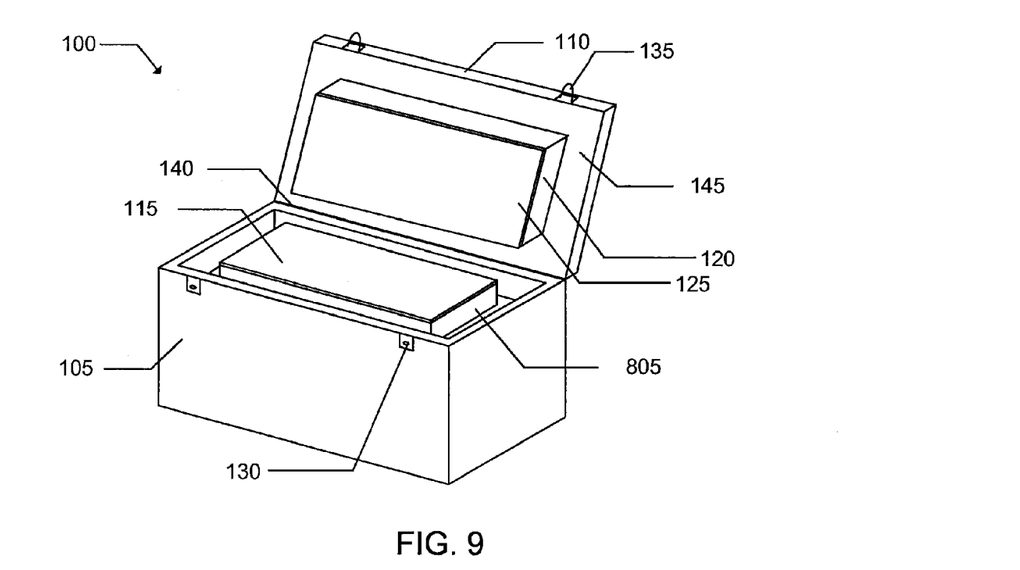
FIG. 9 is a perspective view of an electrical test apparatus.

As shown in FIG. 9, backing layers may be associated with both the first conducting layer 115 and the second conducting layer 125. For instance, the first conducting layer 115 may be attached to a top surface of a second backing layer 805, and the second conducting layer 125 may be attached to a first backing layer 120. A test apparatus having upper and lower backing layers may accommodate devices and components having irregular shapes on their top and bottom surfaces.

Figure 5:
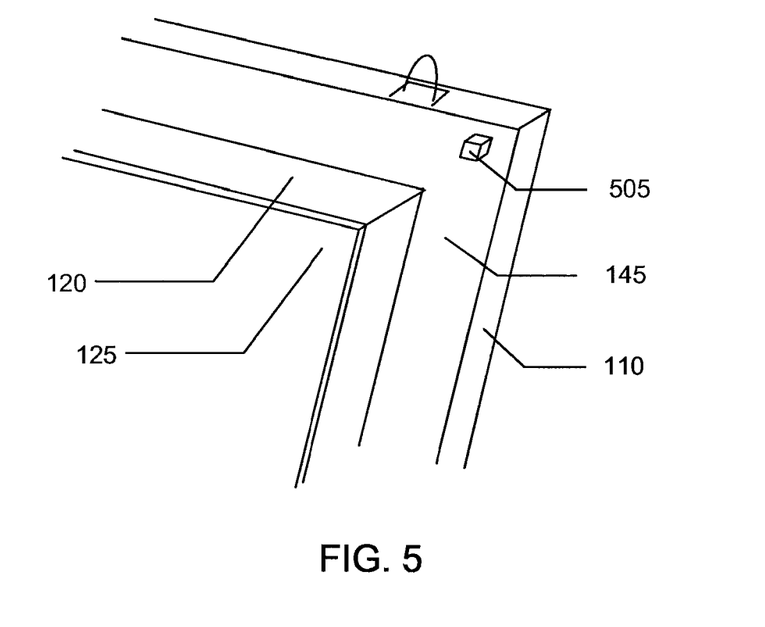
FIG. 5 is a perspective view of an electrical test apparatus.

For safety purposes, the test apparatus 100 may include a switch to detect the position of the lid 110. For instance, to protect the operator from accidental electrocution, the test apparatus 100 may not function unless the lid 110 is in a closed position. As shown in FIG. 5, a safety switch 505 may be positioned on a bottom surface 145 of the lid 110 and may detect the position of lid 110. In particular, the safety switch may detect the lid 110 in a closed position. Similarly, as shown in FIG. 6, the safety switch 605 may be positioned on the rim surface 610 of the enclosure and may detect the position of lid 110. Alternately, a first contact (not shown) may be positioned on the bottom surface 145 of the lid 110 and a second contact (not shown) may be positioned on the rim surface 610 of the enclosure 115. The safety switch (e.g. 505, 605) may operate in any suitable way to disable the device from operating when the lid 110 is in an open position. For example, the safety switch may be released upon opening the lid 110, thereby breaking a circuit and disabling electrical power to the test apparatus 100.

Figure 3:
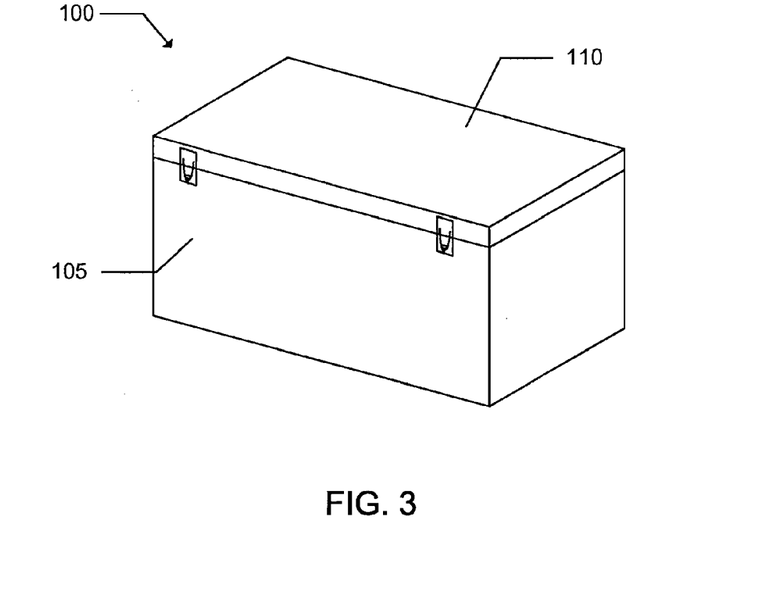
FIG. 3 is a perspective view of an electrical test apparatus.

As shown in FIG. 1, a test apparatus 100 may include a latch assembly including a first latch mechanism 130 and a second latch mechanism 135. The first latch mechanism 130 may be configured to mate with the second latch mechanism 135 to hold the lid in a closed position, as shown in FIG. 3. The latch assembly may include any suitable retention device including, for example, a lock, a ratchet, a hook, a snap, a clasp, or a buckle. The latch assembly may allow the operator to adjust the amount of pressure applied from the lid 110 to the device being tested. This may allow the operator to improve the contact between the conducting layers (e.g. 115, 125) and the device being tested, thereby improving repeatability of test results. In addition, and to further protect the operator from accidental electrocution, the latch assembly may incorporate a second safety switch to disable power when the latch assembly is in an open position.

Figure 7:
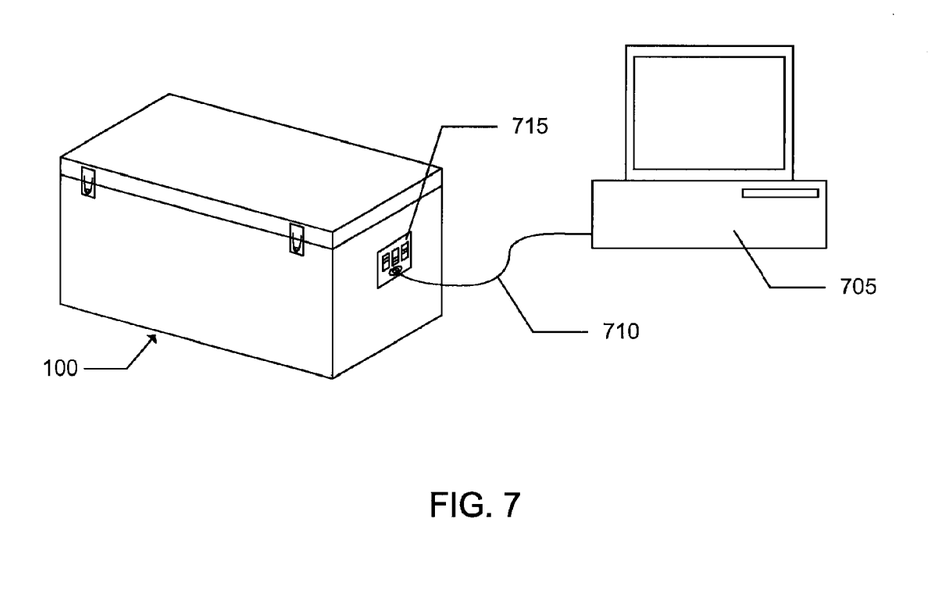
FIG. 7 is a perspective view of an electrical test apparatus connected to a computer.

As shown in FIG. 7, the electrical test apparatus 100 may be connected to a computer 705 via a cable 710. The computer 705 may be used to control test parameters during a dry high-potential test. For instance, test parameters may be controlled through a graphical user interface associated with the computer 705. Alternately, the test parameters may be controlled manually through a control panel 715. The computer 705 may monitor and record data during testing and store data in a database for future reference. For example, the computer 705 may monitor and record time, voltage, and leakage current during a dry high-potential test. The computer may also record data that identifies the device under test (DUT), such as its serial number. In addition, the computer 705 may include software, which allows a dry high-potential test to be conducted without manual input. For instance, a user may place a product into the test apparatus 100, close the lid 110, and initiate a program, which adjusts, monitors, and records data during testing.

In one aspect, an electrical test apparatus may include an enclosure, a first conducting layer disposed within the enclosure, a lid, a first backing layer adjacent to a bottom surface of the lid, and a second conducting layer adjacent to a bottom surface of the first backing layer. A photovoltaic component can be positioned between the first and second conducting layers, and the first and second conducting layers can be configured to conduct any leakage current from the photovoltaic component to a current measuring device, such as, for example, a digital multimeter. For safety purposes, the test apparatus may include a safety switch attached to the enclosure that is configured to detect the position of the lid. Similarly, the test apparatus may include a safety switch attached to the lid that is configured to detect the position of the lid. In particular, the safety may be configured to disable electrical power to the test apparatus when the lid is in an open position. To keep the lid of the test apparatus closed, a first latch mechanism may be attached to the lid and a second latch mechanism may be attached to the enclosure. To retain the lid in a closed position, the first latch mechanism mates with the second latch mechanism. With respect to materials, the first conducting layer may be aluminum foil. The first backing layer may include foam. In particular, the first backing layer may be selected from the group consisting of polystyrene, polymethacrylimide, polyvinylchloride, polyurethane, polypropylene, and polyethylene. Alternately, the first backing layer may include an air bladder. The test apparatus may be connected to a computer configured to receive and store data output from the test apparatus relating to a voltage applied to a photovoltaic module and/or a resulting current leakage. In addition, the computer may be configured to control the voltage applies to the photovoltaic module.

In another aspect, an electrical test apparatus may include an enclosure, a first backing layer disposed within the enclosure, a first conducting layer adjacent to the first backing layer, a lid, and a second conducting layer adjacent to a bottom surface of the lid. A photovoltaic component can be positioned between the first and second conducting layers, and the first and second conducting layers can be configured to conduct any leakage current from the photovoltaic component to a current measuring device. The first and second conducting layers can be configured to apply a voltage to a photovoltaic module in the enclosure. For safety purposes, a safety switch may be attached to the enclosure to detect the position of the lid. Similarly, a safety switch may be attached to the lid to detect the position of the lid. In particular, the safety may be configured to disable electrical power to the test apparatus when the lid is in an open position. A first latch mechanism may be attached to the lid, and a second latch mechanism may be attached to the enclosure. To retain the lid in a closed position, the first latch mechanism may mate with the second latch mechanism. With respect to materials, the first conducting layer may be aluminum foil. The first backing layer may include foam. In particular, the first backing layer may be selected from the group consisting of polystyrene, polymethacrylimide, polyvinylchloride, polyurethane, polypropylene, and polyethylene. Alternately, the first backing layer may include an air bladder. The test apparatus may be connected to a computer configured to receive and store data output from the test apparatus. In addition, the computer may be configured to control the electrical test apparatus.

In another aspect, a method of testing a photovoltaic module may include placing a photovoltaic module into an electrical test apparatus including an enclosure with a lid, a first conducting layer disposed within the enclosure, a first backing layer adjacent to a bottom surface of the lid, and a second conducting layer adjacent to a bottom surface of the first backing layer. The photovoltaic module can be adjacent to the first conducting layer. The method can include closing the lid, applying a voltage to a current carrying conductor within the photovoltaic module, and measuring leakage current from the current carrying layer to the first and second conducting layers. The method may also include recording the leakage current data with a computer, and storing the leakage current data in a database.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features illustrative of the basic principles of the invention.

What is claimed is:

1. An electrical test apparatus for testing a photovoltaic component, comprising:
   an enclosure comprising a lid configured to be placed in an open position and a closed position and wherein the closed position applies force to the photovoltaic component positioned within the enclosure;
   a first conducting layer disposed within the enclosure; and
   a second conducting layer attached to the lid and disposed within the enclosure at least when the lid is in the closed position;

wherein when the lid is in the closed position and electrical power is applied to the photovoltaic component positioned between and in contact with the first and second conducting layers, the first and second conducting layers are configured to conduct any leakage current from the photovoltaic component to a current measuring device.

2. The electrical test apparatus claim 1, wherein the first conducting layer is adjacent to a backing layer.

3. The electrical test apparatus of claim 1, wherein the lid comprises a metal and an insulating material is interposed between the lid and the second conducting layer.

4. The electrical test apparatus of claim 1, further comprising a backing layer, the backing layer configured to apply a substantially uniform force to the photovoltaic component when the lid is in the closed position.

5. The electrical test apparatus of claim 4, wherein the substantially uniform force is applied to the photovoltaic component through the first and second conducting layers when the lid is in the closed position.

6. The electrical test apparatus of claim 4 wherein the lid comprises a sealing frame extending around a perimeter of the backing layer.

7. The electrical test apparatus of claim 1, further comprising a safety switch attached to the enclosure, wherein the safety switch is configured to disable the electrical power when the lid is in the open position.

8. The electrical test apparatus of claim 1, further comprising a computer configured to receive and store data relating to the electrical power applied to the photovoltaic component and the leakage current.

9. The electrical test apparatus of claim 1, further comprising a computer configured to receive and store data relating to a voltage applied to the device and a resulting current leakage.

10. The electrical test apparatus of claim 1, further comprising a computer configured to control the voltage applied to the photovoltaic component.

11. The electrical test apparatus of claim 1, wherein the lid is attached to the enclosure through a connection selected from the group consisting of a hinge, spring, coil, and piston.

12. The electrical test apparatus of claim 1, wherein the lid is removable from the enclosure.

13. An electrical test apparatus for a photovoltaic component, comprising:
    an enclosure comprising a lid having at least an open position and a closed position;
    a first compressible backing layer disposed within the enclosure;
    a first conducting layer adjacent to the first backing layer; and
    a second conducting layer adjacent to a bottom surface of the lid,
    wherein when the lid is in the closed position the backing layer and second conducting layer conform to the shape of the photovoltaic component and the first and second conducting layers conduct any leakage current from the photovoltaic component positioned between the first and second conducting layers to a current measuring device.

14. The electrical test apparatus of claim 13, further comprising a safety switch attached to the enclosure, wherein the safety switch is configured to disable electrical power to the test apparatus when the lid is in the open position.

15. The electrical test apparatus of claim 13, further comprising a safety switch attached to the lid, wherein the safety switch is configured to disable electrical power to the test apparatus when the lid is in the open position.

16. The electrical test apparatus of claim 13, further comprising:
    a first latch mechanism attached to the lid; and
    a second latch mechanism attached to the enclosure,
    wherein the first latch mechanism mates with the second latch mechanism to retain the lid in the closed position.

17. The electrical test apparatus of claim 13, wherein the first backing layer comprises an air bladder.

18. The electrical test apparatus of claim 13, wherein the first backing layer comprises a foam material.

19. The electrical test apparatus of claim 13, wherein the first backing layer comprises a flexible material.

20. The electrical test apparatus of claim 13, wherein the lid comprises a sealing frame extending around a perimeter of the first backing layer.

21. A system comprising:
    a photovoltaic device on which an electric test is to be conducted;
    a controller for controlling the electrical test; and
    a test apparatus within which the electrical test is to be conducted, the test apparatus including:
    an enclosure comprising a lid being movable between at least an open position and a closed position and applying force on the photovoltaic device when in the closed position;
    a first conducting layer disposed within the enclosure; and
    a second conducting layer attached to the lid and disposed within the enclosure at least when the lid is in the closed position,
    wherein when the lid is in the closed position and electrical power is applied to the photovoltaic device positioned between the first and second conducting layers, the first and second conducting layers are configured to conduct any leakage current from the photovoltaic device to a current measuring device.

22. A method for testing a photovoltaic component, the method comprising:
    placing a photovoltaic component into an electrical test apparatus comprising:
        an enclosure comprising a lid having at least an open position and a closed position;
        a first conducting layer disposed within the enclosure at least when the lid is in the closed position;
        a first backing layer adjacent to a bottom surface of the lid; and
        a second conducting layer adjacent to a bottom surface of the first backing layer, wherein the photovoltaic component is adjacent to the first conducting layer;
    closing the lid whereby a force is applied to the photovoltaic component;
    applying a voltage to a current carrying conductor within the photovoltaic component; and
    measuring leakage current between the current carrying conductor and the first and second conducting layers.

23. The method of claim 22, further comprising recording the leakage current data with a computer.

24. The method of claim 22, further comprising evacuating air trapped between the second conducting layer and the photovoltaic component.

25. The method of claim 22, further comprising introducing air into the backing layer using any suitable pressurized air system, thereby changing the pressure that is applied to a photovoltaic component.

* * * * *